United States Patent Office 3,080,390
Patented Mar. 5, 1963

3,080,390
Δ²,⁵-PREGNADIEN-20-ONE DERIVATIVES
John A. Zderic, Palo Alto, Calif., and Albert Bowers, Otto Halpern, and Belig Berkoz, Mexico City, Mexico, assignors, by mesne assignments, to Syntex Corporation, a corporation of Panama
No Drawing. Filed Jan. 31, 1962, Ser. No. 170,272
13 Claims. (Cl. 260—397.3)

The present invention relates to novel cyclopentanophenanthrene derivatives and to a process for the production thereof.

More particularly the present invention relates to novel Δ²,⁵-pregnadien-20-one derivatives.

The novel compounds of the present invention are represented by the following formula:

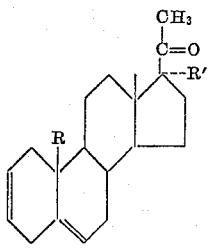

In the above formula R represents hydrogen or methyl and R' represents hydrogen, hydroxyl or an acyloxy group derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds represented by the above formula are progestational agents with oral activity. They are useful oral contraceptives and exhibit anti-estrogenic and anti-gonadotrophic activities. In addition they lower the cholesterol levels in blood, serum, and the adrenal.

The novel compounds of the present invention are prepared by the process illustrated as follows:

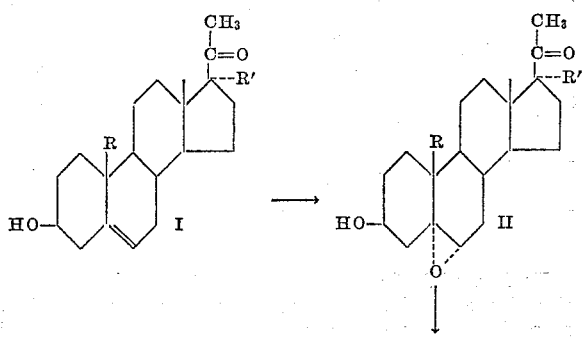

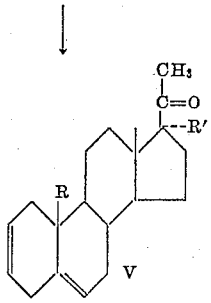

In the above formulas R and R' have the same meaning as previously described.

In practicing the process just outlined, the starting Δ⁵-pregnen-3β-ol-20-one derivative (I) is treated with an organic peracid, preferably monoperphthalic acid, to give the corresponding 5α,6α-oxido pregnan-3β-ol-20-one derivative (II). The latter compound is treated with a lower hydrocarbon sulfonic acid chloride, preferably tosyl chloride, in a tertiary amine such as pyridine, thus affording the respective 3β-tosylate (III) which upon dehydrotosylation with a suitable agent, such as lithium carbonate in dimethylformamide at reflux temperature for a period of time of the order of 3½ hours, yields the corresponding 5α,6α-oxido-Δ²-pregnen-20-one compound (IV). The latter, upon treatment with sodium iodide, sodium acetate and zinc dust in acetic acid, yields the respective Δ²,⁵-pregnadien-20-one derivative (V).

The following specific examples, serve to illustrate, but are not intended to limit the scope of the present invention:

PREPARATION 1

A mixture of 6.6 g. of 19-nor-pregnenolone prepared in accordance with the copending patent application of Zderic et al. Serial No. 164,626, filed January 5, 1962, 2.7 g. of p-toluenesulfonic acid and 300 cc. of acetate anhydride was submitted to a slow distillation; during 5 hours. The residue was cooled and poured into iced water. The product was then extracted with ether, the extract washed successively with an aqueous solution of sodium carbonate and water to neutral, dried and evaporated to dryness. The residue consisted of 3β,20-diacetoxy-19-nor-Δ⁵,¹⁷⁽²⁰⁾-pregnadiene which was utilized in the following step without purification.

6 g. of this crude diacetoxy compound were treated with 480 cc. of a 1.2 molar solution of perbenzoic acid in benzene (2.2 molar equivalents) at room temperature and in the dark, for 20 hours. Water was then added, the organic layer separated, washed with an aqueous solution of sodium bicarbonate, then with water, dried with anhydrous sodium sulfate and evaporated to dryness. The residue consisted of the crude 3β,20β-diacetoxy-5α,6α; 17α,20α-bisoxido-19-nor-pregnane.

This crude oxide compound was treated with 500 cc. of a 1% methanolic solution of potassium hydroxide at room temperature for 1 hour, the mixture was neutralized by addition of acetic acid, concentrated to small volume under reduced pressure, the product was precipitated by addition of ice water, filtered off, washed with water, dried and recrystallized from acetone-methanol, thus yielding 5α,6α-oxido-19-nor-pregnane-3β,17α-diol-20-one.

To 5 g. of the foregoing oxide in 80 cc. of glacial acetic acid, there was added a mixture of 6 g. of sodium iodide, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane yielded 19-nor-$\Delta^5$-pregnene-3$\beta$,17$\alpha$-diol-20-one.

PREPARATION 2

To a solution of 5 g. of the known 17$\alpha$-hydroxy-pregnenolone in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 3$\beta$,17$\alpha$-diacetoxy-$\Delta^5$-pregnen-20-one.

Following the same procedure, the hereinbefore described 19-nor-$\Delta^5$-pregnene-3$\beta$,17$\alpha$-diol-20-one (17$\alpha$-hydroxy-19-nor-pregnenolone) was transformed into 3$\beta$,17$\alpha$-diacetoxy-19-nor-$\Delta^5$-pregnen-20-one.

Upon treatment of 17$\alpha$-hydroxy-pregnenolone and 17$\alpha$-hydroxy-19-nor-pregnenolone by the above described procedure, except that acetic anhydride was substituted by propionic anhydride and caproic anhydride, there were correspondingly obtained:

3$\beta$,17$\alpha$-dipropionoxy-$\Delta^5$-pregnen-20-one,
3$\beta$,17$\alpha$-dipropionoxy-19-nor-$\Delta^5$-pregnen-20-one,
3$\beta$,17$\alpha$-dicaproxy-$\Delta^5$-pregnen-20-one and
3$\beta$,17$\alpha$-dicaproxy-19-nor-$\Delta^5$-pregnen-20-one.

PREPARATION 3

2 g. of 3$\beta$,17$\alpha$-diacetoxy-$\Delta^5$-pregnen-20-one dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 17$\alpha$-acetoxy-$\Delta^5$-pregnen-3$\beta$-ol-20-one.

When applying the above procedure to

3$\beta$,17$\alpha$-diacetoxy-19-nor-$\Delta^5$-pregnen-20-one,
3$\beta$,17$\alpha$-dipropionoxy-$\Delta^5$-pregnen-20-one,
3$\beta$,17$\alpha$-dipropionoxy-19-nor-$\Delta^5$-pregnen-20-one,
3$\beta$,17$\alpha$-dicaproxy-$\Delta^5$-pregnen-20-one and
3$\beta$,17$\alpha$-dicaproxy-19-nor-$\Delta^5$-pregnen-20-one, there were respectively obtained:

17$\alpha$-acetoxy-19-nor-$\Delta^5$-pregnen-3$\beta$-ol-20-one,
17$\alpha$-propionoxy-$\Delta^5$-pregnen-3$\beta$-ol-20-one,
17$\alpha$-propionoxy-19-nor-$\Delta^5$-pregnen-3$\beta$-ol-20-one,
17$\alpha$-caproxy-$\Delta^5$-pregnen-3$\beta$-ol-20-one and
17$\alpha$-caproxy-19-nor-$\Delta^5$-pregnen-3$\beta$-ol-20-one.

Example I

A solution of 2.5 g. of pregnenolone in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 5$\alpha$,6$\alpha$-oxido-pregnan-3$\beta$-ol-20-one.

The starting compounds under I were treated following the above procedure, thus affording the corresponding products under II.

| I | II |
|---|---|
| 19-nor-pregnenolone | 5$\alpha$,6$\alpha$-oxido-19-nor-pregnan-3$\beta$-ol-20-one. |
| 17$\alpha$-hydroxy-pregnenolone | 5$\alpha$,6$\alpha$-oxido-3$\beta$-17$\alpha$-dihydroxy-pregnan-20-one. |
| 17$\alpha$-hydroxy-19-nor-pregnenolone | 5$\alpha$,6$\alpha$-oxido-3$\beta$,17$\alpha$-dihydroxy-19-nor-pregnan-20-one. |
| 17$\alpha$-acetoxy-$\Delta^5$-pregnen-3$\beta$-ol-20-one. | 5$\alpha$,6$\alpha$-oxido-17$\alpha$-acetoxy-pregnan-3$\beta$-ol-20-one. |
| 17$\alpha$-acetoxy-19-nor-$\Delta^5$-pregnen-3$\beta$-ol-20-one. | 5$\alpha$,6$\alpha$-oxido-17$\alpha$-acetoxy-19-nor-pregnan-3$\beta$-ol-20-one. |
| 17$\alpha$-propionoxy-$\Delta^5$-pregnen-3$\beta$-ol-20-one. | 5$\alpha$,6$\alpha$-oxido-17$\alpha$-propionoxy-pregnan-3$\beta$-ol-20-one. |
| 17$\alpha$-propionoxy-19-nor-$\Delta^5$-pregnen-3$\beta$-ol-20-one. | 5$\alpha$,6$\alpha$-oxido-17$\alpha$-propionoxy-19-nor-pregnan-3$\beta$-ol-20-one. |
| 17$\alpha$-caproxy-$\Delta^5$-pregnen-3$\beta$-ol-20-one. | 5$\alpha$,6$\alpha$-oxido-17$\alpha$-caproxy-pregnan-3$\beta$-ol-20-one. |
| 17$\alpha$-caproxy-19-nor-pregnen-3$\beta$-ol-20-one. | 5$\alpha$,6$\alpha$-oxido-17$\alpha$-caproxy-19-nor-pregnan-3$\beta$-ol-20-one. |

Example II

A solution of 5 g. of 5$\alpha$,6$\alpha$-oxido-pregnan-3$\beta$-ol-20-one in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 3$\beta$-tosylate of the starting compound. The total crude tosylate in 50 cc. of cold dimethylformamide was added over 15 minutes to a suspension of 5 g. of finely divided lithium carbonate in 25 cc. of refluxing dimethylformamide. The mixture was refluxed for 3½ hours further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Recrystallization of the residue gave 5$\alpha$,6$\alpha$-oxido-$\Delta^2$-pregnen-20-one.

The starting compounds under I upon treatment by the preceding method, afforded first the corresponding 3$\beta$-tosylates and thereafter the products under II.

| I | II |
|---|---|
| 5$\alpha$,6$\alpha$-oxido-19-nor-pregnan-3$\beta$-ol-20-one. | 5$\alpha$,6$\alpha$-oxido-19-nor-$\Delta^2$-pregnen-20-one. |
| 5$\alpha$,6$\alpha$-oxido-3$\beta$,17$\alpha$-dihydroxy-pregnan-20-one. | 5$\alpha$,6$\alpha$-oxido-17$\alpha$-hydroxy-$\Delta^2$-pregnen-20-one. |
| 5$\alpha$,6$\alpha$-oxido-3$\beta$,17$\alpha$-dihydroxy-19-nor-pregnan-20-one. | 5$\alpha$,6$\alpha$-oxido-17$\alpha$-hydroxy-19-nor-$\Delta^2$-pregnen-20-one. |
| 5$\alpha$,6$\alpha$-oxido-17$\alpha$-acetoxy-pregnan-3$\beta$-ol-20-one. | 5$\alpha$,6$\alpha$-oxido-17$\alpha$-acetoxy-$\Delta^2$-pregnen-20-one. |
| 5$\alpha$,6$\alpha$-oxido-17$\alpha$-acetoxy-19-nor-pregnan-3$\beta$-ol-20-one. | 5$\alpha$,6$\alpha$-oxido-17$\alpha$-acetoxy-19-nor-$\Delta^2$-pregnen-20-one. |
| 5$\alpha$,6$\alpha$-oxido-17$\alpha$-propionoxy-pregnan-3$\beta$-ol-20-one. | 5$\alpha$,6$\alpha$-oxido-17$\alpha$-propionoxy-$\Delta^2$-pregnen-20-one. |
| 5$\alpha$,6$\alpha$-oxido-17$\alpha$-propionoxy-19-nor-pregnan-3$\beta$-ol-20-one. | 5$\alpha$,6$\alpha$-oxido-17$\alpha$-propionoxy-19-nor-$\Delta^2$-pregnen-20-one. |
| 5$\alpha$,6$\alpha$-oxido-17$\alpha$-caproxy-3$\beta$-ol-20-one. | 5$\alpha$,6$\alpha$-oxido-17$\alpha$-caproxy-$\Delta^2$-pregnen-20-one. |
| 5$\alpha$,6$\alpha$-oxido-17$\alpha$-caproxy-19-nor-pregnan-3$\beta$-ol-20-one. | 5$\alpha$,6$\alpha$-oxido-17$\alpha$-caproxy-19-nor-$\Delta^2$-pregnen-20-one. |

Example III

To 5 g. of 5$\alpha$,6$\alpha$-oxido-$\Delta^2$-pregnen-20-one in 80 cc. of glacial acetic acid, there was added a mixture of 6 g. of sodium iodide, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane yielded $\Delta^{2,5}$-pregnadien-20-one.

When applying the above procedure to the starting compounds under I, there were obtained the corresponding products under II.

| I | II |
|---|---|
| 5α,6α-oxido-19-nor-Δ²-pregnen-20-one. | 19-nor-Δ²,⁵-pregnadien-20-one. |
| 5α,6α-oxido-17α-hydroxy-Δ²-pregnen-20-one. | 17α-hydroxy-Δ²,⁵-pregnadien-20-one. |
| 5α,6α-oxido-17α-hydroxy-19-nor-Δ²-pregnen-20-one. | 17α-hydroxy-19-nor-Δ²,⁵-pregnadien-20-one. |
| 5α,6α-oxido-17α-acetoxy-Δ²-pregnen-20-one. | 17α-acetoxy-Δ²,⁵-pregnadien-20-one. |
| 5α,6α-oxido-17α-acetoxy-19-nor-Δ²-pregnen-20-one. | 17α-acetoxy-19-nor-Δ²,⁵-pregnadien-20-one. |
| 5α,6α-oxido-17α-propionoxy-Δ²-pregnen-20-one. | 17α-propionoxy-Δ²,⁵-pregnadien-20-one. |
| 5α,6α-oxido-17α-propionoxy-19-nor-Δ²-pregnen-20-one. | 17α-propionoxy-19-nor-Δ²,⁵-pregnadien-20-one. |
| 5α,6α-oxido-17α-caproxy-Δ²-pregnen-20-one. | 17α-caproxy-Δ²,⁵-pregnadien-20-one. |
| 5α,6α-oxido-17α-caproxy-19-nor-Δ²-pregnen-20-one. | 17α-caproxy-19-nor-Δ²,⁵-pregnadien-20-one. |

We claim:
1. A compound of the following formula:

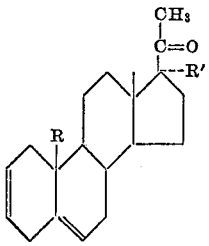

wherein R is selected from the group consisting of hydrogen and methyl and R' is selected from the group consisting of hydrogen, hydroxyl and a hydrocarbon carboxylic acyloxy group of less than 12 carbon atoms.

2. Δ²,⁵-pregnadien-20-one.
3. 19-nor-Δ²,⁵-pregnadien-20-one.
4. 17α-hydroxy-Δ²,⁵-pregnadien-20-one.
5. 17α-hydroxy-19-nor-Δ²,⁵-pregnadien-20-one.
6. 17α-acetoxy-Δ²,⁵-pregnadien-20-one.
7. 17α-acetoxy-19-nor-Δ²,⁵-pregnadien-20-one.
8. 17α-propionoxy-Δ²,⁵-pregnadien-20-one.
9. 17α-propionoxy-19-nor-Δ²,⁵-pregnadien-20-one.
10. 17α-caproxy-Δ²,⁵-pregnadien-20-one.
11. 17α-caproxy-19-nor-Δ²,⁵-pregnadien-20-one.
12. The hydrocarbon carboxylic acid esters of less than 12 carbon atoms of 17α-hydroxy-Δ²,⁵-pregnadien-20-one.
13. The hydrocarbon carboxylic acid esters of less than 12 carbon atoms of 17α-hydroxy-19-nor-Δ²,⁵-pregnadien-20-one.

No references cited.